(12) United States Patent
Zhang et al.

(10) Patent No.: US 11,886,084 B2
(45) Date of Patent: Jan. 30, 2024

(54) DISPLAY SUBSTRATE, DISPLAY PANEL AND DISPLAY DEVICE

(71) Applicant: BOE TECHNOLOGY GROUP CO., LTD., Beijing (CN)

(72) Inventors: Chenyang Zhang, Beijing (CN); Fuqiang Li, Beijing (CN); Ming Yang, Beijing (CN); Pengxia Liang, Beijing (CN); Jiahui Han, Beijing (CN)

(73) Assignee: BOE TECHNOLOGY GROUP CO., LTD., Beijing (CN)

( * ) Notice: Subject to any disclaimer, the term of this patent is extended or adjusted under 35 U.S.C. 154(b) by 171 days.

(21) Appl. No.: 17/429,676

(22) PCT Filed: Oct. 30, 2020

(86) PCT No.: PCT/CN2020/125422
§ 371 (c)(1),
(2) Date: Aug. 10, 2021

(87) PCT Pub. No.: WO2022/088078
PCT Pub. Date: May 5, 2022

(65) Prior Publication Data
US 2022/0350209 A1    Nov. 3, 2022

(51) Int. Cl.
*G02F 1/1362* (2006.01)
*G02F 1/1368* (2006.01)
(Continued)

(52) U.S. Cl.
CPC .... *G02F 1/136218* (2021.01); *G02F 1/13439* (2013.01); *G02F 1/13685* (2021.01);
(Continued)

(58) Field of Classification Search
CPC ......... G02F 1/136218; G02F 1/136227; G02F 1/13685
See application file for complete search history.

(56) References Cited

U.S. PATENT DOCUMENTS

2004/0263441 A1*  12/2004  Tanaka ................. H10K 59/805
                                                       345/76
2015/0192781 A1    7/2015  Lee
(Continued)

FOREIGN PATENT DOCUMENTS

CN         1936660 A    3/2007
CN       101128939 A    2/2008
(Continued)

*Primary Examiner* — Jonathan Y Jung
(74) *Attorney, Agent, or Firm* — HOUTTEMAN LAW LLC

(57) ABSTRACT

The disclosure provides a display substrate, a display panel and a display device. The display substrate has a display area and a peripheral area surrounding the display area, and includes: a first base; multiple pixel units in the display area and on the first base, each pixel units includes a thin film transistor and a first electrode, in each pixel unit, a second electrode of the thin film transistor is electrically coupled with the first electrode through a first via hole penetrating through an interlayer insulating layer; and an auxiliary functional layer located in the display area and on a side, away from the first base, of the first electrode; an orthographic projection of the auxiliary functional layer on the first base covers at least a part of an orthographic projection of the first via hole on the first base, and defines an active display area of each first electrode.

20 Claims, 13 Drawing Sheets

(51) Int. Cl.
  *G02F 1/1335*  (2006.01)
  *G02F 1/1343*  (2006.01)

(52) U.S. Cl.
  CPC .. *G02F 1/133512* (2013.01); *G02F 1/133514* (2013.01); *G02F 1/136227* (2013.01)

(56) References Cited

U.S. PATENT DOCUMENTS

| | | | | |
|---|---|---|---|---|
| 2015/0277200 | A1* | 10/2015 | Baek | G02F 1/1345 |
| | | | | 257/72 |
| 2016/0124280 | A1* | 5/2016 | Park | G02F 1/13394 |
| | | | | 438/151 |
| 2017/0176814 | A1* | 6/2017 | Sasaki | G02F 1/133553 |
| 2017/0277012 | A1 | 9/2017 | Huh et al. | |
| 2018/0124384 | A1 | 5/2018 | Huh et al. | |
| 2019/0312133 | A1* | 10/2019 | Kimura | H01L 27/1288 |
| 2020/0103692 | A1* | 4/2020 | Tamaki | G02F 1/13336 |
| 2020/0144550 | A1* | 5/2020 | Lee | G06F 3/0412 |

FOREIGN PATENT DOCUMENTS

| | | | |
|---|---|---|---|
| CN | 102169256 | A | 8/2011 |
| CN | 102854674 | A | 1/2013 |
| CN | 110579900 | A | 12/2019 |
| CN | 110824727 | A | 2/2020 |
| CN | 210982932 | U | 7/2020 |
| JP | 2004004526 | A | 1/2004 |

\* cited by examiner

DISPLAY SUBSTRATE, DISPLAY PANEL AND DISPLAY DEVICE

TECHNICAL FIELD

The present disclosure relates to the field of display technology, and particularly relates to a display substrate, a display panel and a display device.

BACKGROUND

A Thin Film Transistor Liquid Crystal Display (TFT-LCD) is an important flat panel display device. With the development of display technology, high resolution, high transmittance, large size, low power consumption and low cost have become the development direction of the future display field.

SUMMARY

The present disclosure is directed to at least one of the technical problems of the related art, and provides a display substrate, a display panel and a display device.

In a first aspect, an embodiment of the present disclosure provides a display substrate, which includes: a display area and a peripheral area surrounding the display area;
a first base;
a plurality of pixel units located in the display area and on the first base; each of the plurality of pixel units includes a thin film transistor and a first electrode, and in each pixel unit, a second electrode of the thin film transistor is electrically coupled with the first electrode through a first via hole penetrating through an interlayer insulating layer;
an auxiliary functional layer located in the display area and on a side, away from the first base, of a layer where the first electrode is located; where, an orthographic projection of the auxiliary functional layer on the first base covers at least a part of an orthographic projection of the first via hole on the first base, and defines an active display area of the first electrode.

In some implementations, the auxiliary functional layer includes a plurality of hollow-out patterns, and orthographic projections of active display areas of first electrodes are overlapped with orthographic projections of the hollow-out patterns on the first base one to one.

In some implementations, the hollow-out patterns are arranged in one-to-one correspondence with the active display areas of the first electrodes.

In some implementations, the display substrate includes a plurality of electrode groups arranged at intervals along a first direction, each of the electrode groups including a plurality of first electrodes arranged at intervals along a second direction; the first direction and the second direction intersect;
the first electrode further includes an inactive display area;
the auxiliary functional layer includes a plurality of auxiliary portions arranged at intervals along the first direction; an orthographic projection of the inactive display area of each first electrode in the electrode group on the first base is substantially overlapped with an orthographic projection of the auxiliary portion corresponding to the electrode group on the first base.

In some implementations, the auxiliary portions are provided in one-to-one correspondence with the electrode groups.

In some implementations, the auxiliary functional layer includes a conductive material.

In some implementations, the conductive material includes one or a combination of molybdenum, aluminum, and titanium.

In some implementations, the display substrate further includes:
a first signal connection line located in the peripheral area, on the first base and electrically coupled with the auxiliary functional layer; the first signal connection line is configured to provide an electrical signal to the auxiliary functional layer.

In some implementations, the first signal connection line and the first electrode are disposed in a same layer and are made of a same material.

In some implementations, the first signal connection line surrounds the display area.

In some implementations, the display substrate further includes:
an active semiconductor layer including a channel region, a source doping region and a drain doping region of each thin film transistor;
a gate insulating layer located on a side, away from the first base, of the active semiconductor layer;
a first conductive layer located on a side, away from the active semiconductor layer, of the gate insulating layer and including a gate of each thin film transistor;
a first insulating layer located on a side, away from the gate insulating layer, of the first conductive layer;
a first source-drain metal layer located on a side, away from the first conductive layer, of the first insulating layer; the first source-drain metal layer includes a plurality of data lines, and a first electrode of the thin film transistor is coupled with the data line;
a second gate insulating layer located on a side, away from the first insulating layer, of the first source-drain metal layer;
a second source-drain metal layer located on a side, away from the first source-drain metal layer, of the second insulating layer; the second source-drain metal layer includes the first electrode of each pixel unit.

In some implementations, an orthographic projection of the first source-drain metal layer on the first base and an orthographic projection of the second source-drain metal layer on the first base are at least partially overlapped.

In some implementations, the first electrode includes a reflective electrode.

In a third aspect, an embodiment of the present disclosure provides a display panel, including the display substrate described above, an opposite substrate disposed opposite to the display substrate, and a liquid crystal layer disposed between the display substrate and the opposite substrate.

In some implementations, the opposite substrate includes:
a second base; and
a second electrode located on a side of the second base proximal to the liquid crystal layer, and an orthographic projection of the second electrode on the first base covers an orthographic projection of any first electrode of the pixel unit on the first base.

In some implementations, the display substrate further includes a second signal connection line disposed in the same layer as the auxiliary functional layer and electrically coupled to the auxiliary functional layer, the second signal connection line is electrically coupled with the second electrode through a sealant; and
the second electrode is electrically coupled with the first signal connection line through the sealant.

In some implementations, the opposite substrate further includes:
  a color filter layer located on a side, proximal to the second electrode, of the second base; the color filter layer includes a plurality of color filters, and the color filters correspond to the pixel units one to one.

In some implementations, the opposite substrate further includes:
  a color filter layer located on a side, proximal to the second electrode, of the second base; the color filter layer includes a plurality of color filters and a black matrix arranged between adjacent ones of the color filters, and the color filters correspond to the pixel units one to one.

In a third aspect, an embodiment of the present disclosure provides a display device, which includes the display panel described above.

In some implementations, the display device further includes:
  a light source assembly configured to provide a light source to the display panel.

DRAWINGS

DETAILED DESCRIPTION

In order to make the technical solutions of the present disclosure better understood, the present disclosure is further described in detail with reference to the accompanying drawings and the detailed description below.

Unless defined otherwise, technical or scientific terms used herein shall have the ordinary meaning as understood by one of ordinary skill in the art to which this disclosure belongs. The use of "first," "second," and the like in this disclosure is not intended to indicate any order, quantity, or importance, but rather is used to distinguish one element from another. Also, the use of the terms "a," "an," or "the" and similar referents do not denote a limitation of quantity, but rather denote the presence of at least one. The word "includes" or "comprises", and the like, means that the element or item preceding the word contains the element or item listed after the word and its equivalent, but does not exclude other elements or items. The terms "coupled" or "connected" and the like are not restricted to physical or mechanical connections, but may include electrical connections, whether direct or indirect. "Upper", "lower", and the like are used only to indicate relative positional relationships, and when the absolute position of the object being described is changed, the relative positional relationships may also be changed accordingly.

Figure 1:
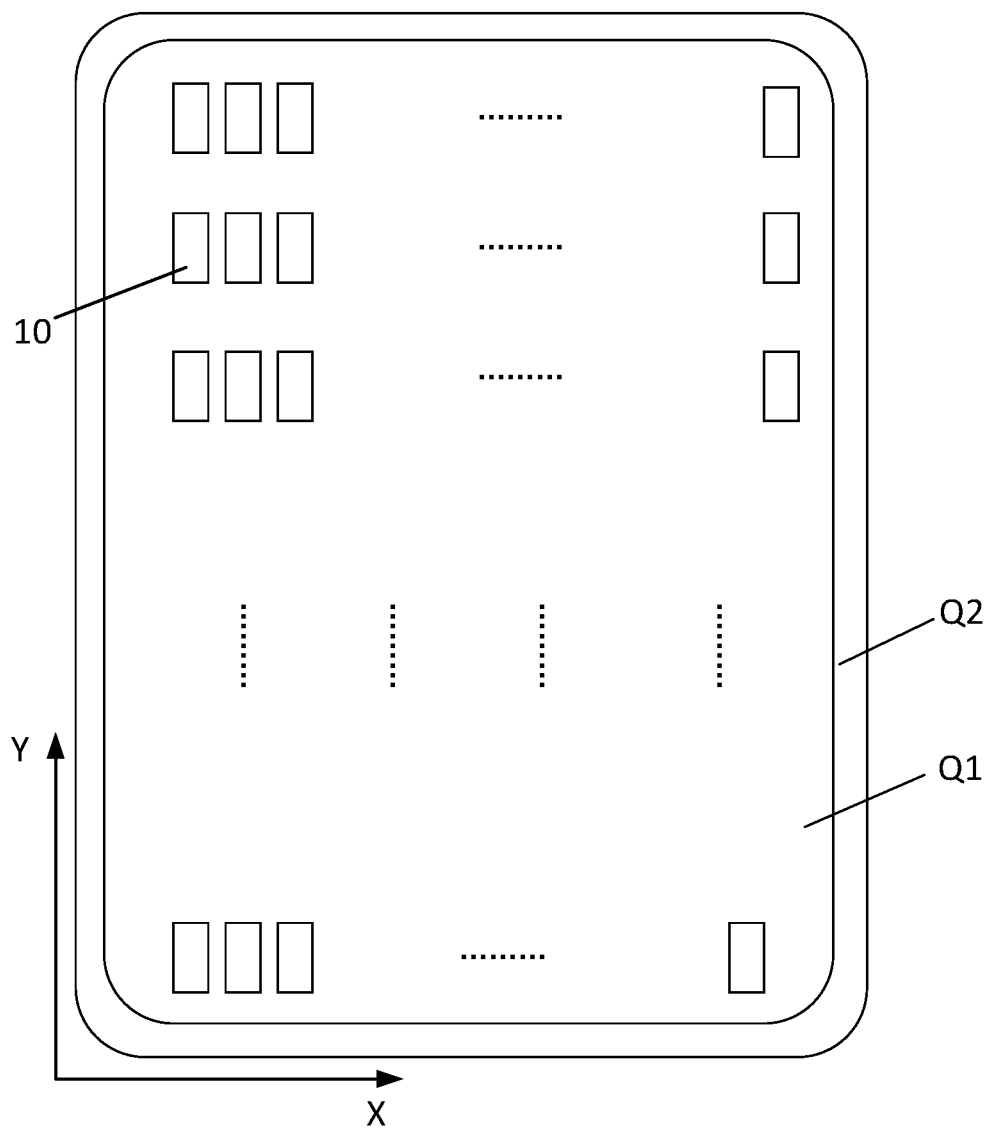
FIG. 1 is a schematic diagram of an exemplary display panel.

In a first aspect, FIG. 1 is a schematic diagram of a display panel according to an embodiment of the present disclosure; as shown in FIG. 1, the display panel includes a plurality of pixel units 10 arranged in an array along a first direction and a second direction; the first direction intersects the second direction, one of the first direction and the second direction may be a row direction and the other is a column direction. In the embodiment of the present disclosure, the first direction is taken as the row direction, and the second direction is taken as the column direction for description. The plurality of pixel units 10 in the embodiment of the present disclosure may include, but are not limited to, a red pixel unit 10, a green pixel unit 10, a blue pixel unit 10, and the like.

Figure 2:
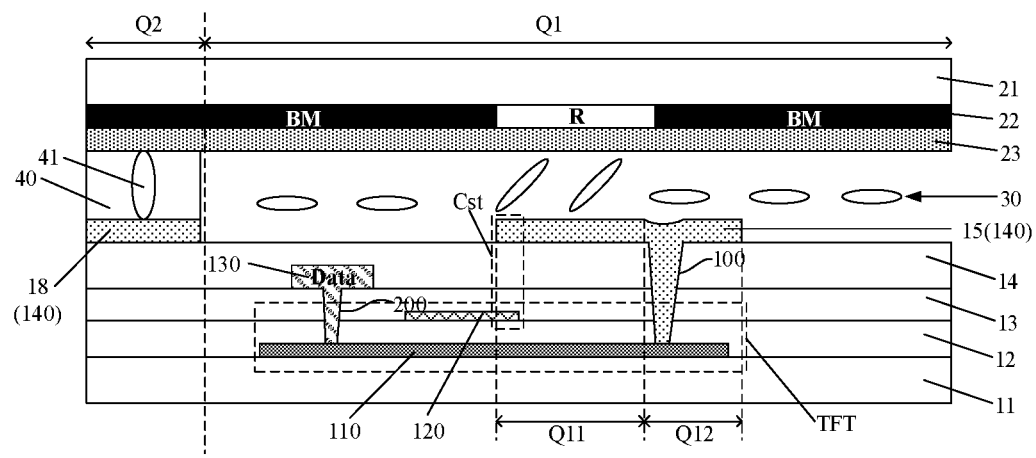
FIG. 2 is a cross-sectional view of the display panel of FIG. 1 taken along line A-A'.

FIG. 2 is a cross-sectional view of the display panel of FIG. 1; as shown in FIG. 2, the display panel has a display area Q1 and a peripheral area Q2 surrounding the display area Q1, and the display panel includes a display substrate and an opposite substrate which are oppositely disposed, and a liquid crystal layer 30 disposed between the display substrate and the opposite substrate, and the display substrate and the opposite substrate are aligned and assembled to from a cell by a sealant 40 disposed in the peripheral area Q2. The display substrate may be an array substrate, and the opposite substrate may be a color filter substrate; certainly, the display substrate may be a COA (Color On Array; for example, a color filter layer 22 is provided on an array substrate) substrate, and the color filter layer 22 is not provided on the opposite substrate. In the embodiment of the present disclosure, the display substrate is taken as the array substrate, and the opposite substrate is taken as the color filter substrate.

Figure 3:
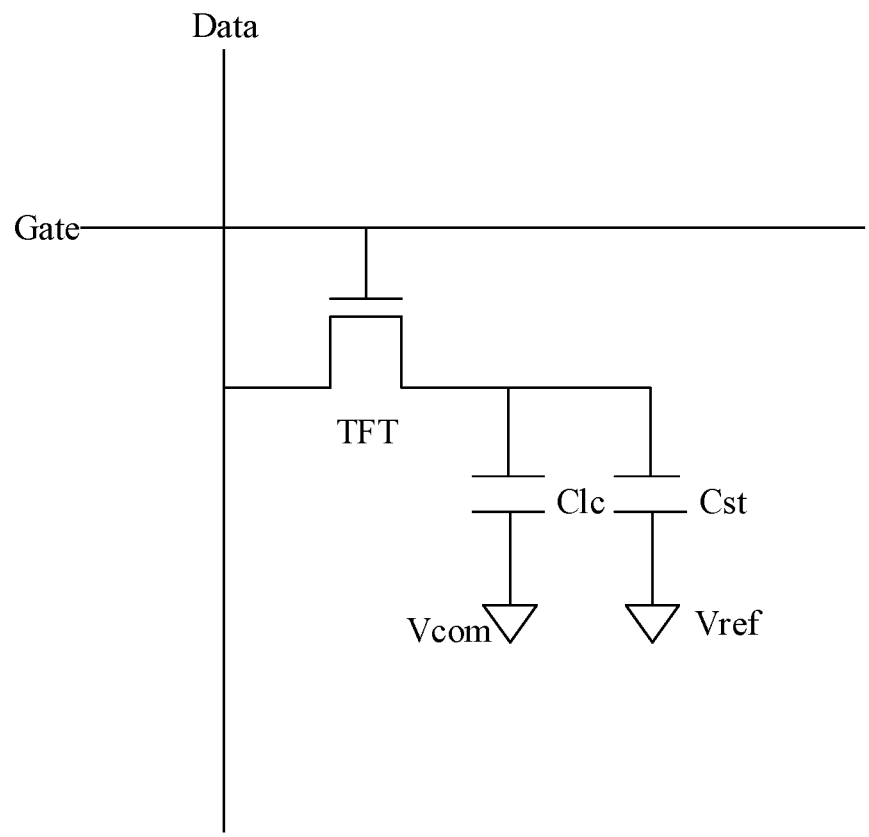
FIG. 3 is a schematic diagram of an equivalent circuit in a pixel unit.

FIG. 3 is a schematic diagram of an equivalent circuit in a pixel unit 10; as shown in FIG. 3, the equivalent circuit includes a thin film transistor TFT, a storage capacitor Cst, a liquid crystal capacitor Clc; a first electrode of the thin film transistor TFT is coupled with a data line Data, a second electrode of the thin film transistor TFT is coupled with a first plate of the storage capacitor Cst and a first plate of the liquid crystal capacitor Clc, and a control electrode of the thin film transistor TFT is coupled with a gate line Gate; a second plate of the storage capacitor Cst is coupled to a reference voltage terminal Vref; a second plate of the liquid crystal capacitor Clc is coupled to a common voltage signal. When the gate line Gate is written with an operation level signal, the thin film transistor TFT is turned on, and display of a corresponding gray scale is realized by a data line voltage signal written in the data line Data.

In addition, transistors employed in the embodiments of the present disclosure may be thin film transistors TFT, field effect transistors, or other switching devices having the same characteristics, and the thin film transistors TFT may include oxide semiconductor thin film transistors TFT, amorphous silicon thin film transistors TFT, polycrystalline silicon thin film transistors TFT, or the like. For each transistor, it includes a first electrode, a second electrode and a control electrode; the control electrode is used as a gate of the transistor, one of the first electrode and the second electrode is used as a source of the transistor, and the other one is used as a drain of the transistor; the source and the drain of the transistor may be symmetrical in structure, so that there may be no difference in physical structure. In the embodiments of the present disclosure, in order to distinguish transistors, except for the gate serving as the control electrode, the first electrode is directly described as the source, and the second electrode is the drain, so that the source and the drain of each of all or part of the transistors in the embodiments of the present disclosure may be interchanged as necessary.

With continued reference to FIG. 2, the structure of the display panel will be specifically described. The array substrate includes a first base 11, and an active semiconductor layer 110, a gate insulating layer 12, a first conductive layer 120, a first insulating layer 13, a first source-drain metal layer 130, a second insulating layer 14 and a second source-drain metal layer 140 which are sequentially formed on the first base 11. The active semiconductor layer 110 includes a channel region, a source doping region and a drain doping region of each thin film transistor TFT in the display area Q1. The first conductive layer 120 includes the gate of each thin film transistor TFT located in the display area Q1, and the gate simultaneously serves as a second plate of the storage capacitor Cst. The first source-drain metal layer 130 includes a plurality of data lines Data located in the display area Q1, and the data lines Data are coupled to source doping regions of thin film transistors TFT through second via holes 200 penetrating through the first insulating layer 13 and the gate insulating layer 12, where positions where the data lines Data are coupled to the source doping regions correspond to t sources of the thin film transistors TFT, for example, the source doping regions of the thin film transistors TFT located in a same column of pixel units 10 are coupled to a same data line Data. The second source-drain metal layer 140 includes first electrodes of the pixel units 10 located in the display area Q1 and a first signal connection line 18 located in the peripheral area Q2, and the first electrode in each pixel unit 10 is coupled to the drain doping region of the thin film transistor TFT through a first via hole 100 penetrating through the second insulating layer 14, the first insulating layer 13 and the gate insulating layer 12. A position where the first electrode is coupled with the drain doping region of the thin film transistor TFT corresponds to the drain of the thin film transistor TFT, and the first electrode in each pixel unit 10 is used as first plates of the storage capacitor Cst and the liquid crystal capacitor Clc; the gate of the thin film transistor TFT may be used as the second plate of the storage capacitor Cst, and a scan signal written into the gate may be used as a reference voltage on the second plate of the storage capacitor Cst.

It should be noted that FIG. 2 only illustrates a case where the first conductive layer 120 is located on the active semiconductor layer 110 in a direction away from the first base 11, and in this case, the formed thin film transistor TFT is a top gate thin film transistor. In practical applications, the active semiconductor layer 110 may also be located on the first conductive layer 120 in the direction away from the first base 11, and the thin film transistor TFT formed in this case is a bottom gate thin film transistor. In the embodiments of the present disclosure, description is made by taking the thin film transistor TFT being the top gate thin film transistor as an example.

With reference to FIG. 2, the color filter substrate includes a second base 21, a color filter layer 22 and a second electrode sequentially formed on the second base 21, and the second electrode is coupled to the first signal connection line 18 through conductive gold balls 41 in the sealant 40 in the peripheral area. The color filter layer 22 includes a plurality of color filters and a black matrix BM disposed between adjacent ones of the color filters. The color filters may include a red filter R, a green filter G (not shown), and a blue filter B (not shown); the second electrode serves as the second plate of the liquid crystal capacitor Clc. Since the second electrodes in the respective pixel units 10 are applied with a same voltage during operation, the second electrodes in the respective pixel units 10 may be of an integral structure, i.e., may be formed into a single piece.

Note that one of the first electrode and the second electrode is a pixel electrode 15, and the other is a common electrode 23; and in the embodiments of the present disclosure, the first electrode is used as the pixel electrode 15 and the second electrode is used as the common electrode 23. When the display panel is a TN mode display panel, an electric field formed by the pixel electrode 15 and the common electrode 23, in the display panel, being applied with voltages is a vertical electric field. In addition, in the embodiment of the present disclosure, the display panel is not limited to the display panel in the vertical electric field mode, and may be a display panel in a horizontal electric field mode such as ADS mode, FFS mode, IPS mode. For the display panel of the horizontal electric field mode, the pixel electrode 15 and the common electrode 23 are both disposed on the array substrate. For example, in the ADS mode, at least one of the pixel electrode 15 and the common electrode 23 in each pixel unit 10 is a slit electrode, for example, the common electrode 23 is arranged on a side of the pixel electrode 15 away from the first base 11, and in such case, the common electrode 23 is the slit electrode, and the pixel electrode 15 is a plate electrode; alternatively, the common electrode 23 is disposed on a side of the pixel electrode 15 proximal to the first base 11, and in such case, the common electrode 23 is the plate electrode, and the pixel electrode 15 is the slit electrode.

In some implementations, the pixel electrode 15 may be a reflective electrode. Here, the reflective electrode means that a surface thereof facing the display side can be used for reflection. In an example, the reflective electrode may be made of a conductive material having a reflective function.

In another example, the reflective electrode is constituted by a conductive layer and a reflective layer provided in a stacked manner, the reflective layer being located on a side of the conductive layer facing the display side. Certainly, the pixel electrode 15 is not limited to the reflective electrode, and may also be a transmissive electrode, that is, light may be transmitted through the pixel electrode 15.

It should be noted that, if the pixel electrode 15 is a reflective electrode, the display device adopting the display panel is a reflective display device, and a light source assembly of the display device is a front light source disposed on the display side of the display panel; if the pixel electrode 15 is a transmissive electrode, the display device adopting the display panel is a transmissive display device, and the light source assembly of the display device is a rear light source disposed on a side of the display panel away from the display side. In the embodiment of the present disclosure, description is made by taking the pixel electrode 15 in the display panel being the reflective electrode as an example. In addition, if the display device adopts the rear light source, a light blocking layer may be formed on a side of the active semiconductor layer 110 proximal to the first base 11, and the light blocking layer blocks light, so as to prevent light emitted by the rear light source from irradiating the active semiconductor layer 110 to affect optical characteristics of the thin film transistor TFT.

In the embodiment of the present disclosure, the first source-drain metal layer 130 formed with the data line Data and the second source-drain metal layer 140 formed with the pixel electrode 15 are disposed in a layered manner, in this case, a distance between the data line Data coupled to each pixel unit and the pixel electrode 15 therein can be reduced, and even orthographic projections of the data line Data coupled to each pixel unit and the pixel electrode 15 therein on the first base 11 may overlap, so as to implement the high resolution design of the display panel.

With continued reference to FIG. 2, each pixel unit 10 may be divided into an active display area Q11 and an inactive display area Q12, where the active display area Q11 corresponds to a relatively flat area on a surface of the pixel electrode 15 proximal to the liquid crystal layer 30, and the inactive display area Q12 corresponds to an uneven area on the surface of the pixel electrode 15 proximal to the liquid crystal layer 30, for example, at a position where the pixel electrode 15 is coupled to the drain doping region of the thin film transistor TFT, due to the existence of the first via hole 100, a position of the pixel electrode 15 corresponding to the drain doping region is the inactive display area Q12. The color filters of the color filter substrate are arranged in one-to-one correspondence with active display areas Q11 of pixel electrodes 15, and an orthographic projection of the black matrix BM on the first base 11 needs to cover inactive display areas Q12 of the pixel electrodes 15, so as to avoid the problem of abnormal display caused by light crosstalk due to uneven surfaces of the pixel electrodes 15 in the display process.

However, with the development of the ultra-high resolution of the display panel, the size of the pixel unit 10 is becoming smaller and smaller, and at the same time, the color filter substrate and the array substrate need to be aligned with each other with high precision. However, due to the limitation of the current process level, the alignment precision between the array substrate and the color filter substrate is about 3 µm, and thus, the alignment precision between the black matrix BM on the color filter substrate and the inactive display areas Q12 of the pixel electrodes 15 is lower, so that the pixel aperture ratio is reduced, and the black matrix BM cannot completely cover the inactive display areas Q12 of the pixel electrodes 15, and further the display effect of the display panel cannot be ensured.

Figure 4:
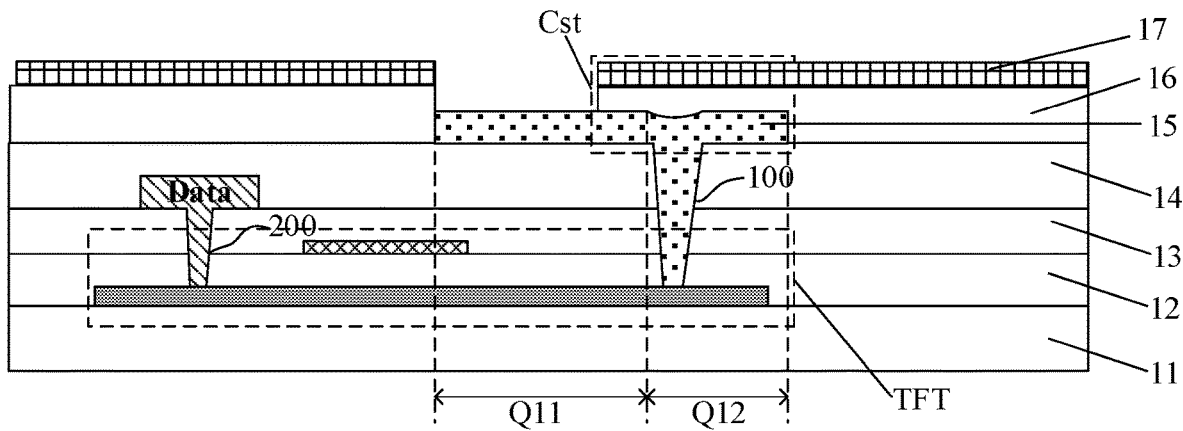
FIG. 4 is a schematic structural diagram of an array substrate according to an embodiment of the present disclosure.

In view of the problem that the black matrix BM cannot completely cover the inactive display areas Q12, an embodiment of the present disclosure further provides an array substrate, and FIG. 4 is a schematic structural diagram of the array substrate according to the embodiment of the present disclosure; as shown in FIG. 4, the array substrate has a display area Q1 and a peripheral area Q2 surrounding the display area Q1; the array substrate includes a first base 11, a plurality of pixel units 10 arranged on the first base 11 and located in the display area Q1, and an auxiliary functional layer 17 arranged on a side, away from the first base 11, of each pixel unit 10 and located in the display area Q1. Each pixel unit 10 includes a thin film transistor TFT and a pixel electrode 15 electrically coupled with a drain doping region of the thin film transistor TFT through a via hole penetrating through an interlayer insulating layer; the auxiliary functional layer 17 is located on a side of the pixel electrode 15 of each pixel unit 10 away from the first base, and an orthographic projection of the auxiliary functional layer 17 on the first base 11 covers at least an orthographic projection of the via hole on the first base 11, and defines an active display area Q11 of the pixel electrode 15, and an area where the orthographic projection of the auxiliary functional layer 17 on the first base 11 and the orthographic projection of the pixel electrode 15 on the first base 11 overlap is the inactive display area Q12 of the pixel electrode 15.

That is, the auxiliary functional layer 17 is configured to control the display panel to which the array substrate according to the embodiment of the present disclosure is applied not to display at a position corresponding to the first via hole 100.

In the array substrate according to the embodiment of the present disclosure, the auxiliary functional layer 17 located on the side of the pixel electrode 15 away from the first base 11 is additionally provided, and the orthographic projection of the auxiliary functional layer 17 on the first base 11 covers at least the orthographic projection of the first via hole 100 on the first base 11, and meanwhile, the active display area Q11 of the pixel electrode 15 is defined; that is to say, the auxiliary functional layer 17 covers at least a part of the pixel electrode 15 corresponding to the first via hole 100, and covers the inactive display area Q12 of the pixel electrode 15, so that the auxiliary functional layer 17 is disposed to ensure that the display panel to which the array substrate of the embodiment of the present disclosure is applied does not display at the position of the pixel electrode 15 corresponding to the first via hole 100, and compared with the position of the pixel electrode 15 corresponding to the first via hole 100 being shielded by the black matrix BM, the auxiliary functional layer 17 shields the via hole, thereby ensuring the alignment precision, and further ensuring the display effect of the display panel to which the array substrate of the embodiment of the present disclosure is applied. It should be noted that, ensuring the alignment precision means that, in the process of manufacturing the array substrate, a material layer of the auxiliary functional layer 17 is firstly disposed on an entire surface of the first base 11, and a material having a certain light transmittance may be selected to form the auxiliary functional layer 17, so that when performing photolithography patterning on the material layer, since the material has a certain light transmittance compared to the BM material, when aligning a mask plate with the array substrate, an alignment mark on the array substrate may be shown through the material layer to a certain extent, and thus, an accurate alignment of the mask plate with the array substrate may be ensured.

In some implementations, the orthographic projection of the auxiliary functional layer 17 on the first base 11 covers the orthographic projection of each via hole penetrating through the interlayer insulating layer on the first base, so as to ensure that the display panel to which the array substrate of the embodiment of the present disclosure is applied does not display at the position of the pixel electrode 15 corresponding to each via hole, and ensure the display effect of the display panel to which the array substrate of the embodiment of the present disclosure is applied. In the embodiment of the present disclosure, the orthographic projection of the auxiliary functional layer 17 on the first base 11 covering the orthographic projection of each via hole penetrating the interlayer insulating layer on the first base is taken as an example for explanation.

Figure 5:
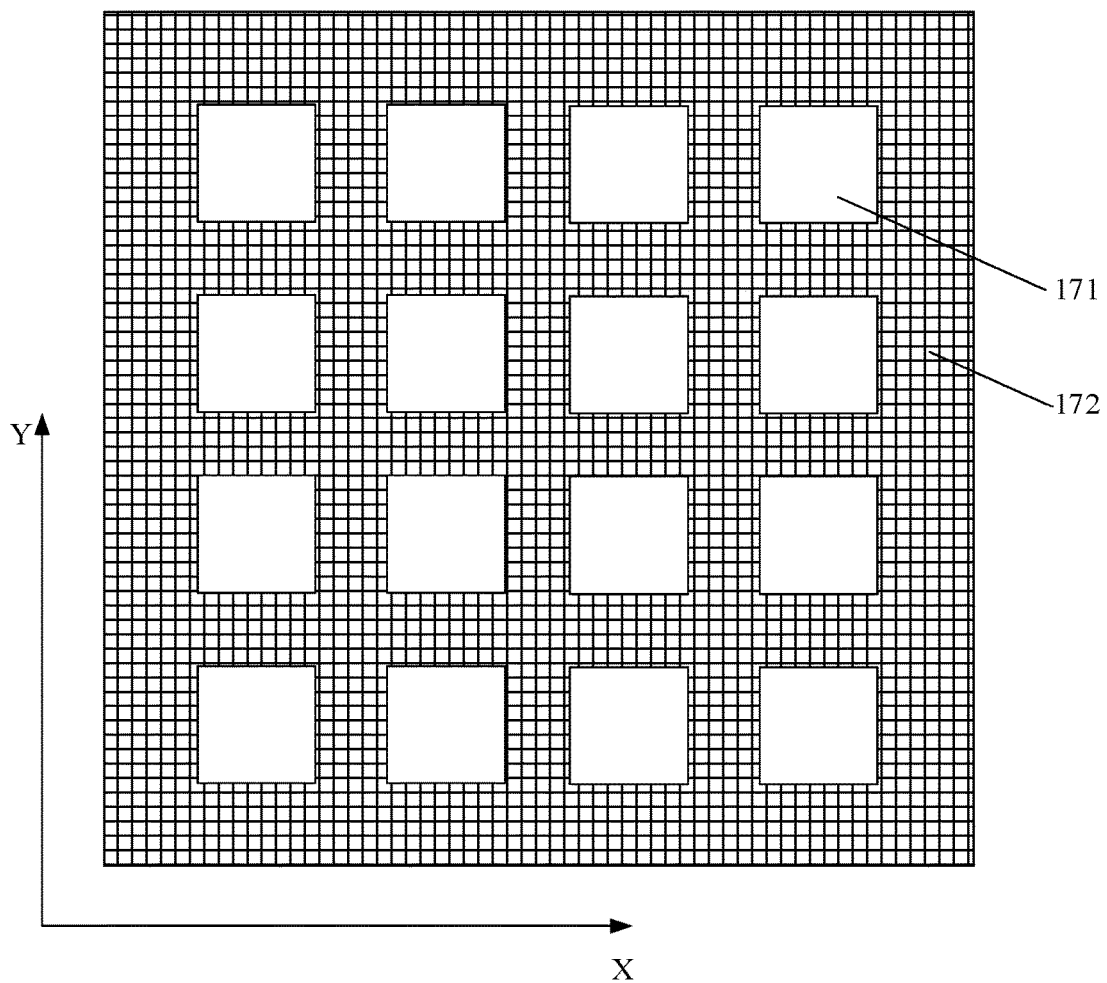
FIG. 5 is a top view of an auxiliary functional layer according to an embodiment of the present disclosure.

In some implementations, the auxiliary functional layer 17 may include a conductive material. FIG. 5 is a top view of the auxiliary functional layer 17 according to an embodiment of the present disclosure; as shown in FIG. 5, the auxiliary functional layer 17 has a plurality of hollow-out patterns 171, and an orthographic projection of each hollow-out pattern 171 is completely overlapped with an orthographic projection of the active display area Q11 of one pixel electrode 15 on the first base 11, for example, the hollow-out patterns 171 are arranged in one-to-one correspondence with the active display areas Q11 of the pixel electrodes 15; a non-hollow-out pattern 172 of the auxiliary functional layer 17 covers the inactive display area Q12 of the pixel electrode 15 of each pixel unit 10. The auxiliary functional layer 17 is configured to receive an electrical signal, and when the array substrate of the embodiment of the present disclosure is applied to a display panel, there is no electric field between the non-hollow-out pattern 172 of the auxiliary functional layer 17 and the common electrode 23, for example, the auxiliary functional layer 17 and the common electrode 23 are applied with a same common voltage signal; that is, the liquid crystal at the position corresponding to the inactive display area Q12 of the pixel electrode 15 is not deflected, and no light is emitted from the display panel at positions corresponding to the inactive display areas Q12.

It should be understood that if the auxiliary functional layer 17 is made of a conductive material, an insulating layer (a third insulating layer 16) is disposed between the auxiliary functional layer 17 and a layer where the pixel electrodes 15 is located to insulate the auxiliary functional layer 17 from the pixel electrodes 15. The shape and size of the hollow-out pattern 171 are determined by the shape and size of the active display area Q11 of the pixel electrode 15. FIG. 5 illustrates the hollow-out pattern 171 as a rectangle, which is not intended to limit the scope of the present disclosure.

With continued reference to FIG. 5, since the auxiliary functional layer 17 is made of a conductive material, the orthographic projection of the non-hollowed-out pattern of the auxiliary functional layer 17 on the first base overlaps with the orthographic projection of the inactive display area Q12 of the pixel electrode 15 on the first base 11, and a storage capacitor Cst is formed in each pixel unit 10; in this case, only one insulating layer (the third insulating layer 16) is interposed between two plates of the storage capacitor Cst, and compared to the case where two insulating layers (the first insulating layer 13 and the second insulating layer 14) are interposed between the two plates of the storage capacitor Cst formed by the gate and the pixel electrode 15 in FIG. 2, the size of the storage capacitor Cst formed in the embodiment of the present disclosure is more easily ensured, so that the display effect can be ensured.

Figure 6:
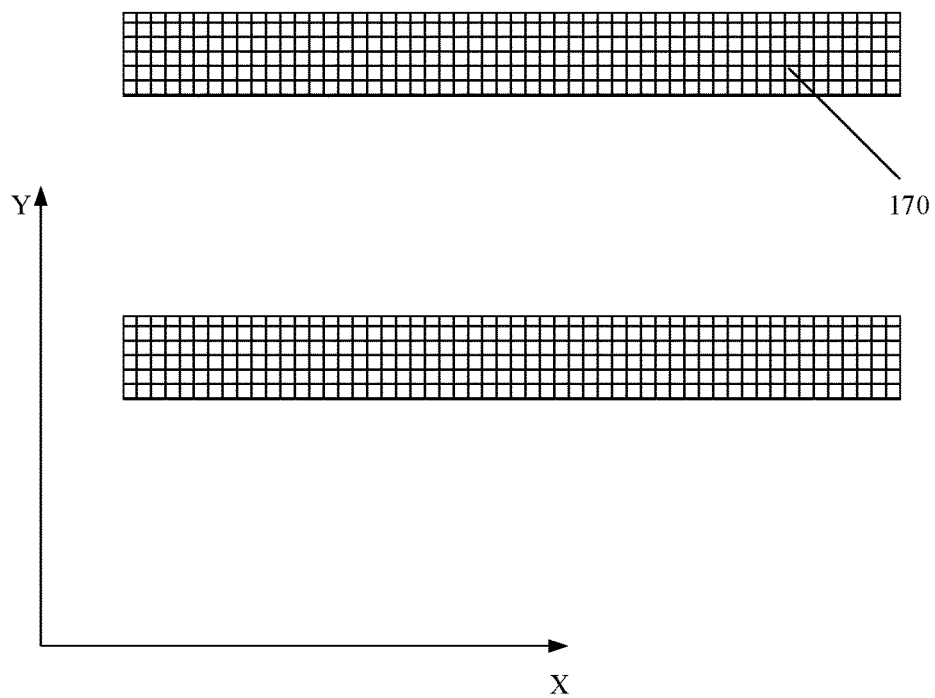
FIG. 6 is a schematic structural diagram of another auxiliary functional layer of an embodiment of the present disclosure.
Figure 11:
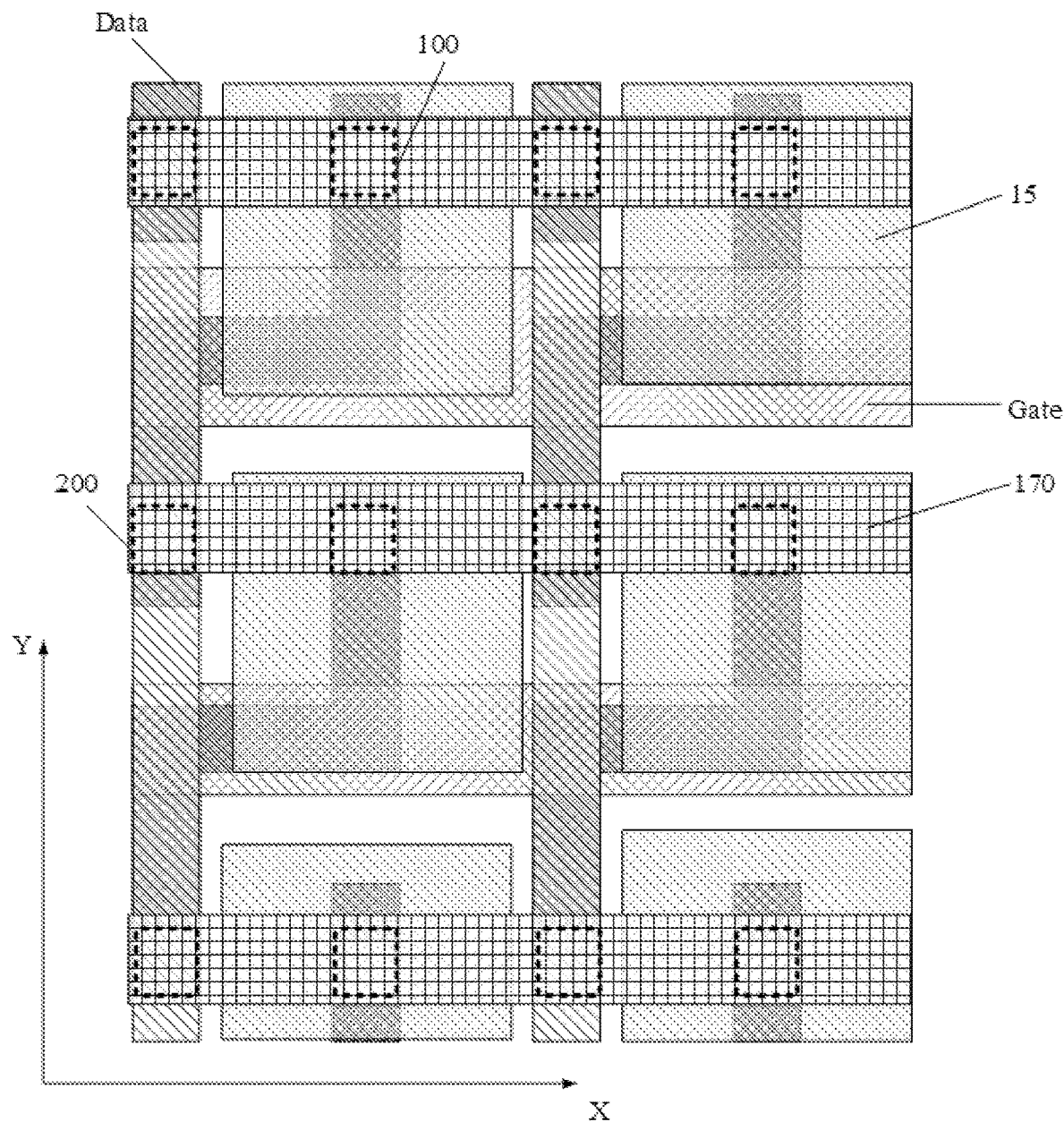
FIG. 11 is a diagram illustrating a 2×2 pixel layout of an array substrate according to an embodiment of the present disclosure.

FIG. 6 is a structural diagram of another auxiliary functional layer of an embodiment of the present disclosure; FIG. 11 illustrates a 2×2 pixel layout of an array substrate according to an embodiment of the present disclosure; as shown in FIG. 6, the pixel electrodes 15 in the array substrate are formed into a plurality of electrode groups arranged side by side in the column direction, each of which includes a plurality of pixel electrodes 15 arranged side by side in the row direction. The auxiliary functional layer 17 includes a plurality of auxiliary sub-portions 170 arranged in the column direction and extending in the row direction; an orthographic projection of each auxiliary sub-portion 170 on the first base 11 covers orthographic projections of the inactive display areas Q12 of the pixel electrodes 15 in a same row on the first base 11; referring to FIGS. 6 and 11, the orthographic projection of each auxiliary sub-portion 170 on the first base not only covers first via holes 100 in a region where a corresponding row of pixel units is located, but also further, by setting overlapping positions of the data line Data and the source doping regions of the thin film transistors TFT, that is, positions of the second via holes 200, the orthographic projection of each auxiliary sub-portion 170 on the first base simultaneously covers the second via holes 200 in the region where the corresponding row of pixel units is located. The auxiliary functional layer 17 is configured to receive an electrical signal, and when the array substrate of the embodiment of the present disclosure is applied to a display panel, there is no electric field between each auxiliary sub-portion 170 of the auxiliary functional layer 17 and the common electrode 23, for example, a same common voltage signal is applied to each auxiliary sub-portion 170 of the auxiliary functional layer 17 and the common electrode 23; that is, the liquid crystal at the position corresponding to the inactive display area Q12 of the pixel electrode 15 is not deflected, and no light is emitted from the display panel at the position corresponding to the inactive display area Q12. Referring to FIG. 6, in the embodiment of the present disclosure, the auxiliary sub-portions 170, each of which is in a stripe structure, arranged side by side are used as the auxiliary functional layer 17, and in this case, openings of the active display areas Q11 are also guaranteed to be stripe-shaped, so that if an alignment shift occurs along the extending direction of the auxiliary sub-portions 170 (for example, along the row direction), an effective exposure area of the active display area Q11 can still be guaranteed.

Figure 7:
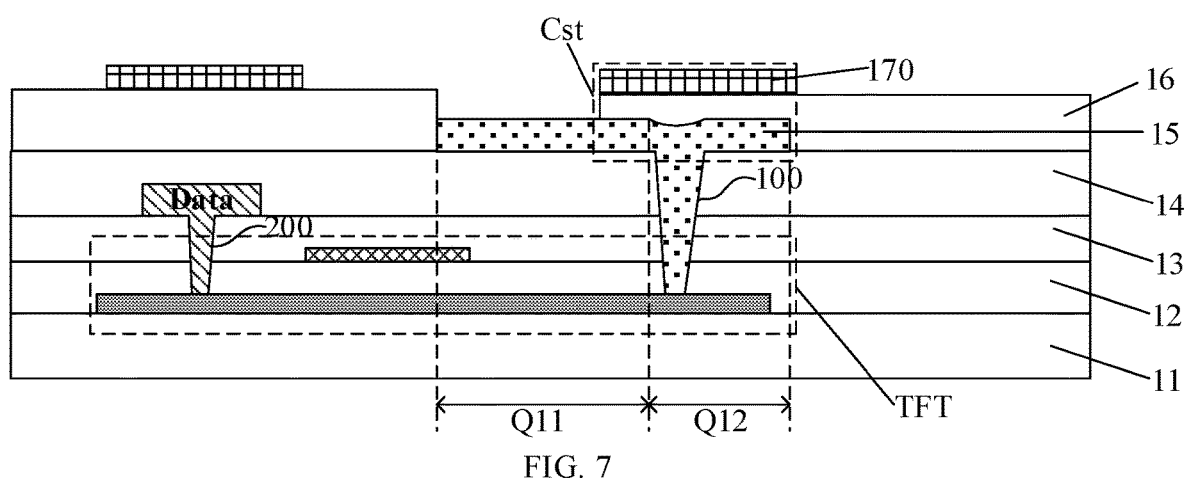
FIG. 7 is a schematic diagram of an array substrate to which the auxiliary functional layer shown in FIG. 6 is applied.

FIG. 7 is a schematic diagram of an array substrate to which the auxiliary functional layer 17 shown in FIG. 6 is applied; as shown in FIG. 7, each auxiliary sub-portion 170 covers the inactive display area Q12 of the pixel electrode 15 and simultaneously forms the storage capacitor Cst with the pixel electrode 15 in each pixel unit 10, and only one insulating layer (the third insulating layer 16) is sandwiched between two plates of the storage capacitor Cst formed in this case, so that the size of the storage capacitor Cst formed in the embodiment of the present disclosure is more easily ensured compared to the case that two insulating layers (the first insulating layer 13 and the second insulating layer 14) are sandwiched between two plates of the storage capacitor Cst formed by the gate and the pixel electrode 15 in FIG. 2, thereby ensuring the display effect. In addition, in the embodiment of the present disclosure, the first source-drain metal layer 130 formed with the data line Data and the second source-drain metal layer 140 formed with the pixel electrode 15 are disposed in a layered manner, in this case, a distance between the data line Data coupled to each pixel unit and the pixel electrode 15 therein may be reduced, and even the orthographic projections of the data line Data coupled to each pixel unit and the pixel electrode 15 therein on the first base 11 may overlap, so as to implement a high resolution design of the display panel. It should be noted that, when the auxiliary functional layer 17 includes the auxiliary sub-portions 170, a width of the third insulating layer 16 in the column direction is slightly larger than a width of the auxiliary portion 170 in the column direction; in a case where the auxiliary functional layer 17 has the hollow-out patterns 171 and the non-hollow-out pattern 172, the third insulating layer 16 may be exposed at the edge of the hollow-out pattern 171. This is done to ensure that the third insulating layer 16 is present between the auxiliary functional layer 17 and the underlying electrode, e.g., the pixel electrode, because there is a manufacturing variation in patterning the auxiliary functional layer 17. Certainly, it is desirable that the exposed region of the third insulating layer 16 completely coincides with the exposed region of the auxiliary functional layer 17.

Figure 8:
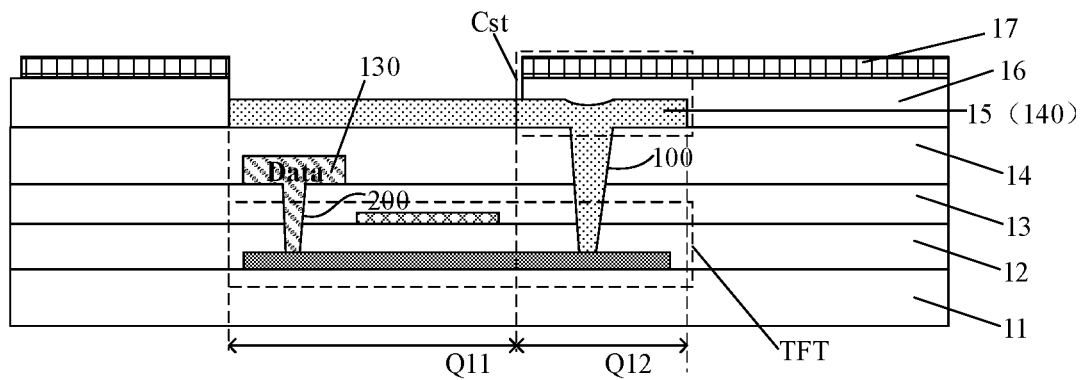
FIG. 8 is a schematic diagram of another array substrate according to an embodiment of the present disclosure.

In some implementations, FIG. 8 is a schematic diagram of another array substrate according to an embodiment of the present disclosure; as shown in FIG. 8, an orthographic projection of the pixel electrode 15 in each pixel unit 10 on the first base partially overlaps an orthographic projection of the data line Data coupled to the pixel unit on the first base, so that the distance between the pixel electrode 15 in each pixel unit 10 and the data line Data coupled to the pixel unit is reduced, which is helpful for achieving high resolution of a display panel to which the array substrate of the embodiment of the present disclosure is applied.

In some implementations, the auxiliary functional layer 17 is made of a transmissive material, so that the alignment precision between the auxiliary functional layer 17 and the inactive display area Q12 of the pixel electrode 15 can be ensured, and the display effect of the display panel to which the array substrate according to the embodiment of the present disclosure is applied can be ensured to a maximum extent. It should be noted that, a requirement of light transmission on the transmissive material here is that when an auxiliary functional material layer is patterned by using the photolithography process, the alignment mark on the base can be identified by an exposure machine through the auxiliary functional material layer. For example, the material of the auxiliary functional layer 17 includes, but is not limited to, one or a combination of molybdenum (Mo), titanium (Ti), aluminum (Al), and the like; for example, the auxiliary functional layer 17 is formed in a three-layered structure using two types of materials of Ti/Al/Ti.

Figure 9:
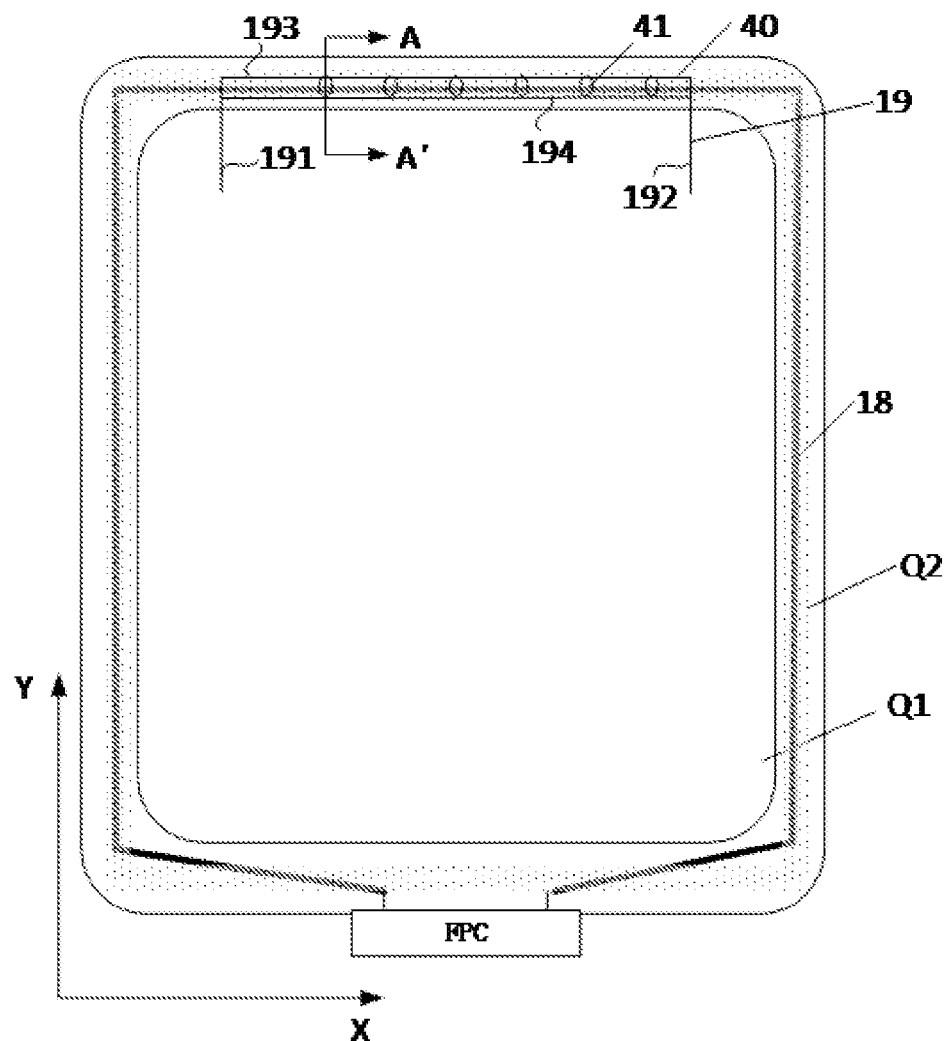
FIG. 9 is a schematic wiring diagram of a first signal connection line according to an embodiment of the present disclosure.
Figure 10:
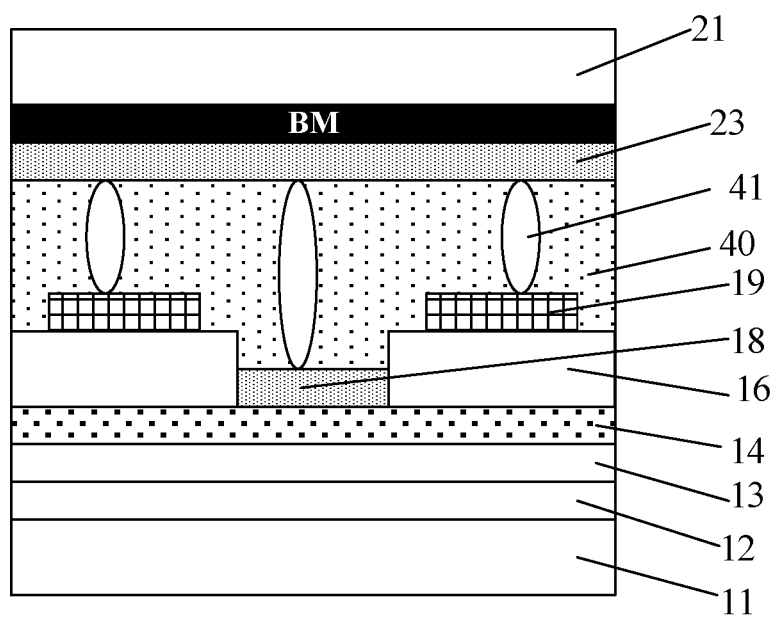
FIG. 10 is a cross sectional view of the structure of FIG. 9 taken along line A-A'.

It should be noted that, in the embodiment of the present disclosure, a transparent conductive material is preferably selected to form the auxiliary functional layer 17, and the deflection of liquid crystal molecules is controlled by applying actual voltages to the auxiliary functional layer 17 and the common electrode, so as to control that no light is emitted from the position of the first via hole 100 during displaying. Certainly, other materials may be required for the auxiliary functional layer 17 in the embodiment of the present disclosure, as long as the auxiliary functional layer is formed on the side of the pixel electrode 15 away from the first base 11, and can prevent light from passing through the position of the first via hole 100 during displaying. The auxiliary functional layer 17 may be made of a light-blocking material, a material through which wavelengths that cannot be recognized by human's eye can transmit, or the like. In some implementations, the array substrate further includes a first signal connection line 18 disposed on the first base 11 and located in the peripheral area Q2, where the first signal connection line 18 is electrically coupled to the auxiliary functional layer 17 for providing an electrical signal to the auxiliary functional layer 17. FIG. 9 is a schematic wiring diagram of the first signal connection line and a second signal connection line of the embodiment of the present disclosure; FIG. 10 is a cross-sectional view of the structure of FIG. 9 taken along line A-A'; as shown in FIGS. 9 and 10, the first signal connection line 18, the second signal line 19, and a sealant 40 are disposed in the peripheral area Q2; the sealant 40 covers at least a part of the first signal connection line 18 and the second signal line 19, and the sealant 40 is provided with conductive gold balls 41 in an area covering the first signal connection line 18 and the second signal line 19; the first signal connection line 18 is arranged around the display area Q1, and meanwhile, a signal terminal of the first signal connection line is bound and coupled with a flexible circuit board through a connection pad; the second signal connection line 19 is configured to electrically couple the auxiliary functional layer to the common electrode 23 through the conductive gold balls 41 in the sealant 40, and the common electrode 23 is coupled to the first signal connection line through the conductive gold balls 41, so as to complete the electrical connection between the first signal connection line 18 and the second signal connection line 19.

With continued reference to FIG. 9, the second signal connection line 19 include at least two connection sub-lines 191, 192 extending along the column direction, one end of each auxiliary sub-portion 170 is coupled to the connection sub-line 191, and the other end of each auxiliary sub-portion 170 is coupled to the connection sub-line 192, so that the electrical signals transmitted from the conductive gold balls to the second signal connection line 19 can be transmitted to the auxiliary sub-portion 170 via the two connection sub-lines 191, 192, thereby ensuring signal consistency of the auxiliary functional layer 170 in the entire display substrate. Further, the second signal connection line 19 at least includes connection sub-lines 193 and 194 extending along the row direction, the two connection sub-lines 193 and 194 are located on two sides of the first signal connection line 18 along the column direction, for example, the connection sub-line 193 is located on an upper side of the first signal connection line 18, and the connection sub-line 194 is located on a lower side of the first signal connection line 18 (where, the upper side and the lower side refer to two opposite sides along the column direction). In addition, lengths of the connection sub-lines 193 and 194 along the row direction should be greater than a certain threshold, so as to ensure an effective contact area between the second signal connecting line 19 and the sealant 40, and ensure that the common voltage signal can be effectively transmitted from the conductive gold balls 41 of the sealant 40 to the auxiliary functional layer 17. In order to make structures of layers of the array substrate more clear in the embodiments of the present disclosure, the array substrate of the embodiments of the present disclosure is described with reference to the layout of the array substrate and the layout of the layers.

Figure 12:
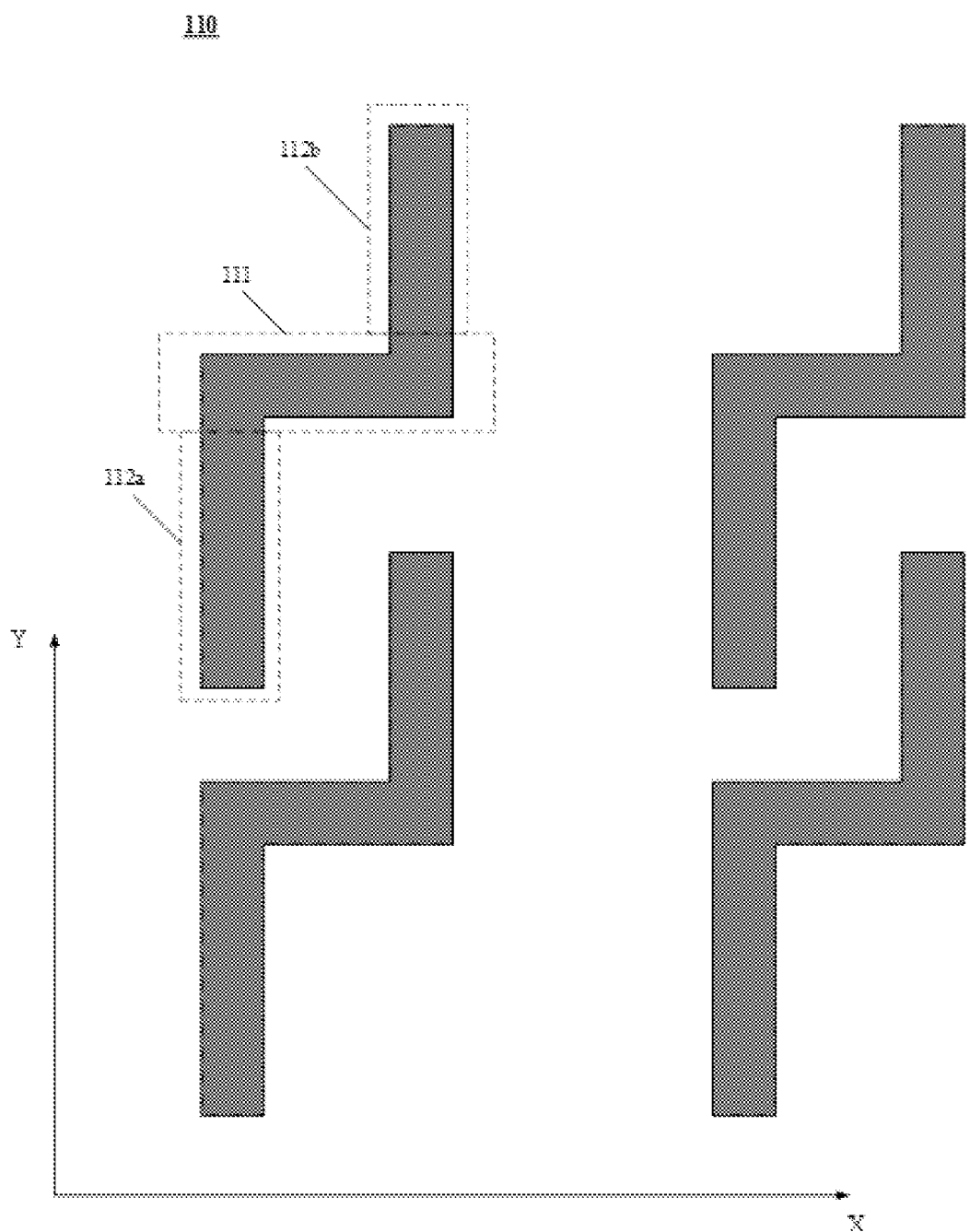
FIG. 12 is a diagram illustrating a layout of an active semiconductor layer of an array substrate according to an embodiment of the present disclosure.

FIG. 12 illustrates a layout of the active semiconductor layer 110 of the array substrate according to the embodiment of the present disclosure; as shown in FIGS. 11 and 12, the active semiconductor layer 110 may be formed by patterning a semiconductor material layer. The active semiconductor layer 110 may be used to fabricate an active layer pattern (channel region) and a doping region pattern (source/drain doping region) of the thin film transistor TFT in each pixel unit 10, and the active layer pattern and the doping region pattern of a same thin film transistor TFT are integrally formed into a single piece. Referring to FIG. 12, since the active semiconductor layer 110 is shown as a broken line portion including each thin film transistor TFT, in this case, a source doping region and a drain doping region are disposed at upper and lower sides of a channel region for each thin film transistor TFT, the channel region is disposed opposite to a gate/gate line Gate to be formed subsequently, the source doping region of the thin film transistor TFT is electrically coupled to the data line Data to be formed subsequently through the second via hole 200, and the drain doping region of the thin film transistor TFT is electrically coupled to the pixel electrode 15 to be formed subsequently through the first via hole 100, and thus, for the thin film transistor TFT of each pixel unit 10, the first via hole 100 and the second via hole 200 are disposed at two sides of the gate line Gate respectively and are not in a same column. In the pixel unit 10 of the thin film transistor TFT using a "U-shaped" active layer in the related art, since the source doping region and the drain doping region are located at a same side of the channel region, the first via hole 100 and the second via hole 200 in each pixel unit 10 are also located at a same side of the gate line Gate. Compared with the related art, in the array substrate in the embodiment of the present disclosure, the first via hole 100 and the second via hole 200 of the thin film transistor TFT in a same pixel unit 10 are neither in a same row nor in a same column, thereby the problem that the performance of the array substrate is affected due to excessive concentration of the via holes is avoided.

It should be noted that the active layer may include an integrally formed low-temperature polysilicon layer, and a source region and a drain region may be conducted by doping or the like to electrically couple the respective structures. That is, the active semiconductor layer 110 of each thin film transistor TFT is an entire pattern formed of p-Si, and each thin film transistor TFT includes a doping region pattern (i.e., the source doping region and the drain doping region) and an active layer pattern, with active layers of different thin film transistors TFT being separated by a doping structure.

For example, the active semiconductor layer 110 may be made of amorphous silicon, polycrystalline silicon, an oxide semiconductor material, or the like. It should be noted that the source region and the drain region may be regions doped with n-type impurities or p-type impurities.

Figure 13:
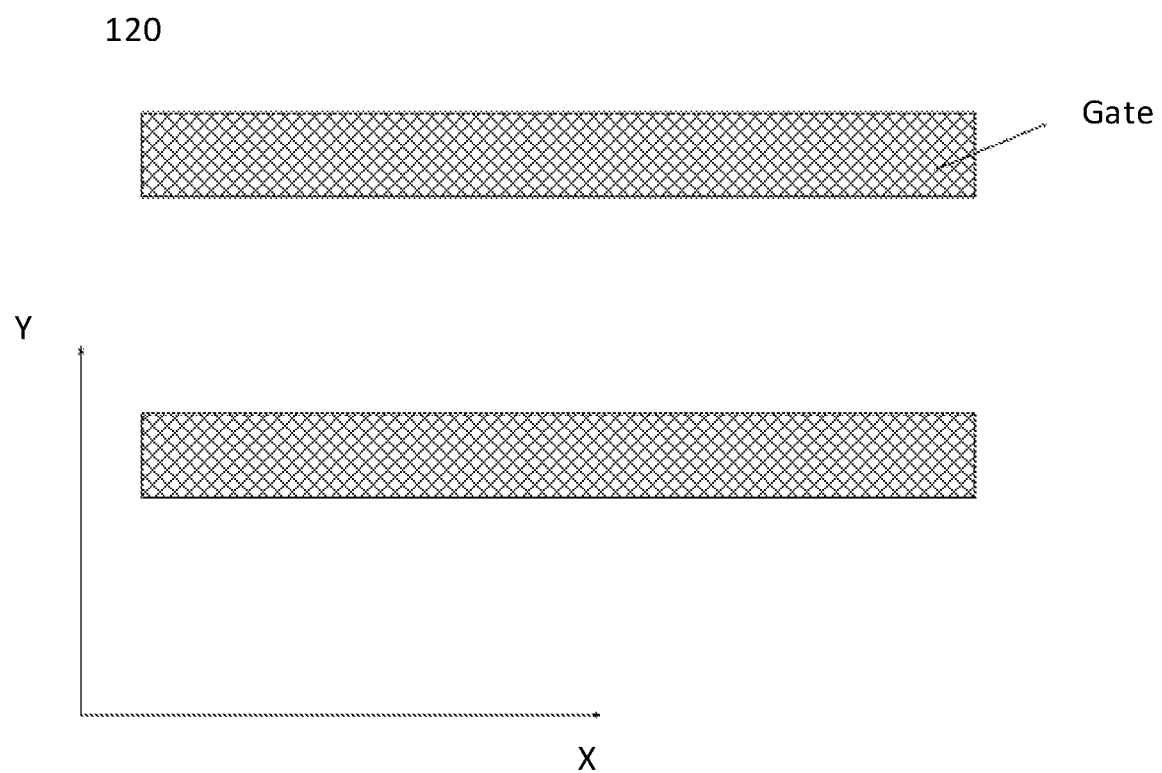
FIG. 13 is a diagram illustrating a layout of a first conductive layer of an array substrate according to an embodiment of the present disclosure.
Figure 14:
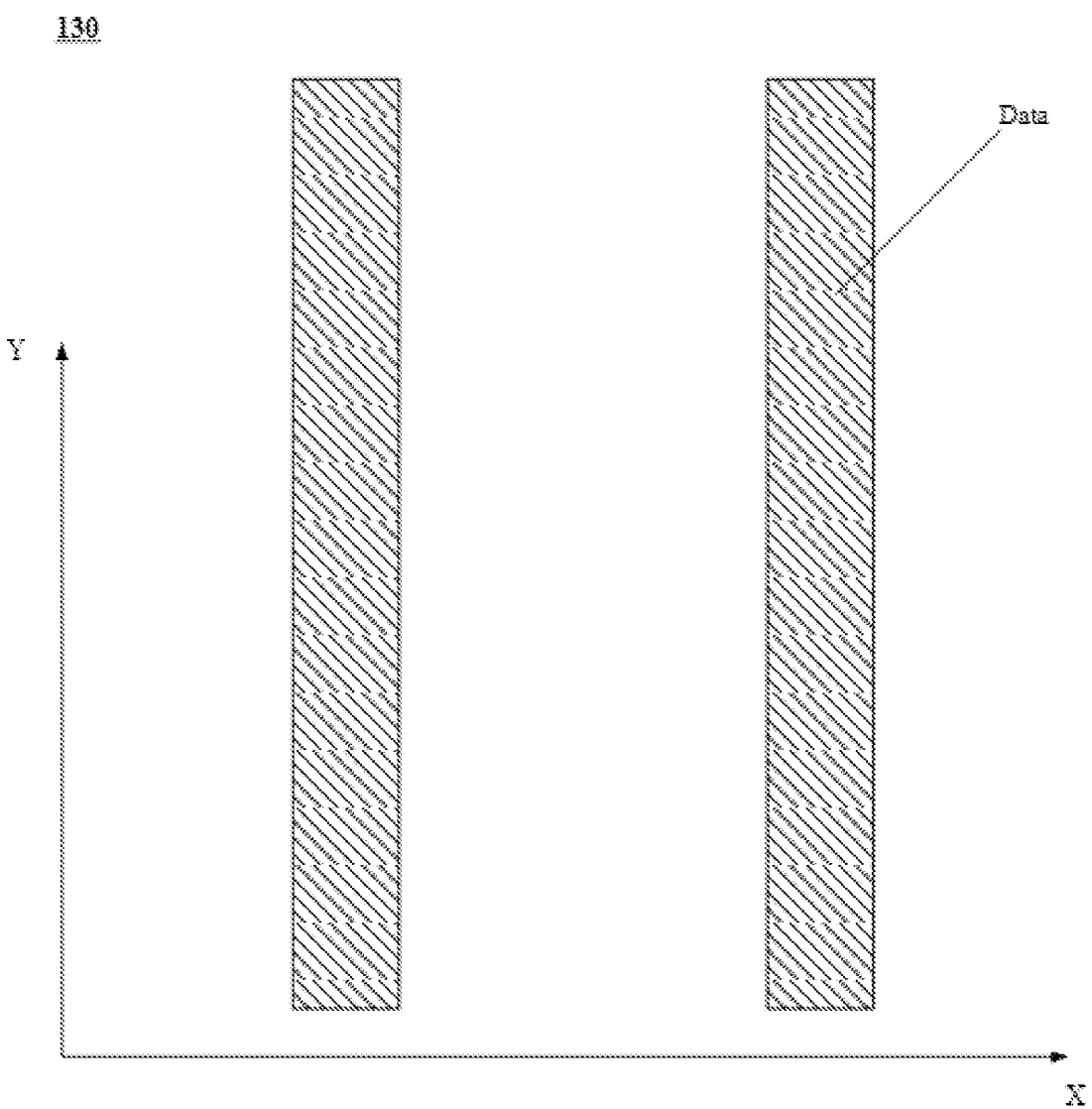
FIG. 14 is diagram illustrating a layout of a first source-drain metal layer of an array substrate according to an embodiment of the present disclosure.

The gate insulating layer 12 is formed on the side of the active semiconductor layer 110 away from the first base 11 to insulate the active semiconductor layer 110 from the first conductive layer 120 to be formed later. FIG. 13 illustrates a layout of the first conductive layer of the array substrate according to an embodiment of the present disclosure; as shown in FIG. 13, the first conductive layer 120 includes a plurality of gate lines Gate arranged in the column direction and extending in the row direction, and referring to FIG. 11, a portion of each gate line Gate opposite to the channel region in the active semiconductor layer 110 serves as the gate of each thin film transistor TFT. The first insulating layer 13 is formed on the side of the first conductive layer 120 away from the first base 11, and is used for insulating the first conductive layer 120 from the first source-drain metal layer 130 formed later. FIG. 14 illustrates a layout of the first source-drain metal layer 130 of the array substrate according to the embodiment of the present disclosure; as shown in FIG. 14, a plurality of data lines Data are arranged in the row direction and extend in the column direction are provided, and referring to FIG. 10, each data line Data is electrically coupled to drain doping regions of thin film transistors TFT in a corresponding column through via holes penetrating the first insulating layer 13 and the gate insulating layer 12.

Figure 15:
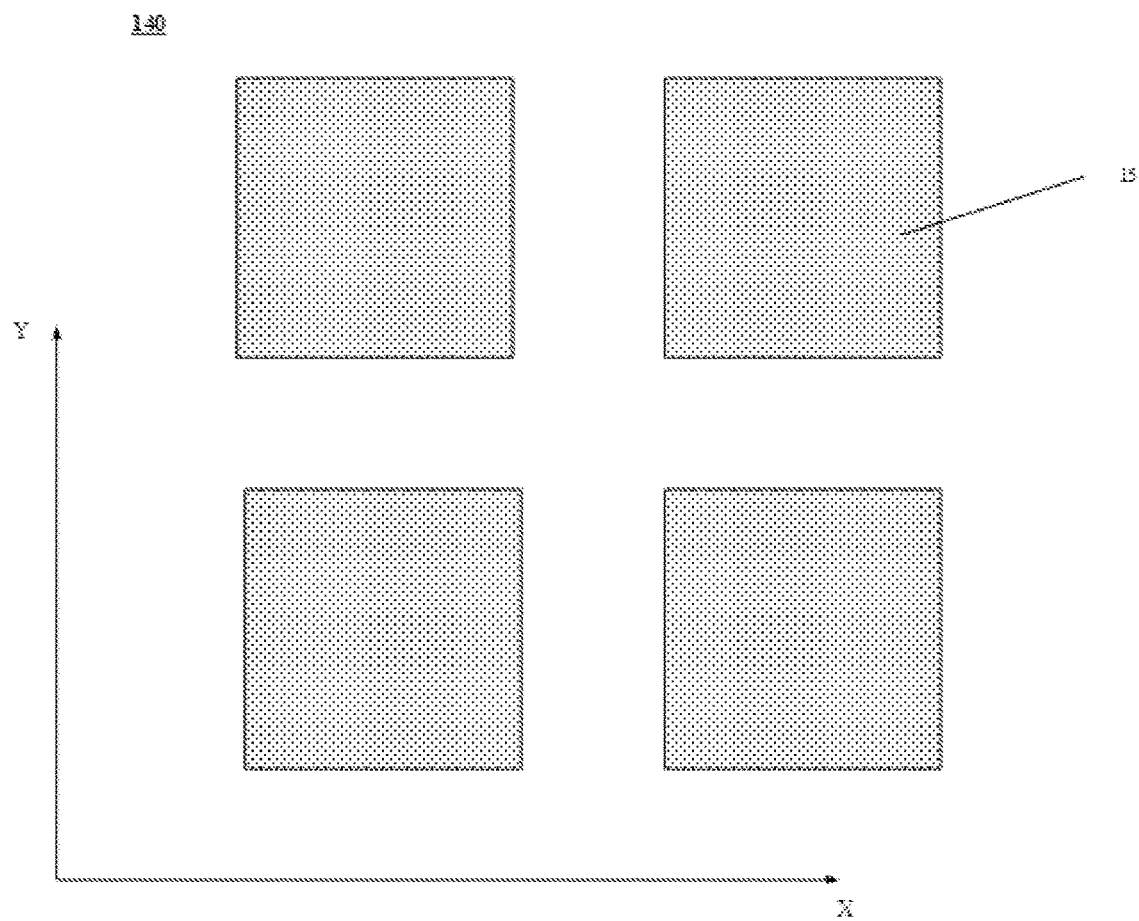
FIG. 15 is a diagram illustrating a layout of a second source-drain metal layer of an array substrate according to the embodiment of the present disclosure.

The second insulating layer 14 is formed on the side of the first source-drain metal layer 130 away from the first base 11, and is used for insulating the first source-drain metal layer 130 from the second source-drain metal layer 140 to be formed later. FIG. 15 illustrates a layout of the second source-drain metal layer 140 of the array substrate according to an embodiment of the present disclosure; as shown in FIG. 15, the second source-drain metal layer 140 includes the pixel electrodes 15 in the respective pixel units 10, and each pixel electrode 15 serves as first plates of the storage capacitor Cst and the liquid crystal capacitor Clc. The material of the pixel electrode 15 in the embodiment of the present disclosure includes, but is not limited to, one or more combinations of silver (Ag), titanium (Ti), aluminum (Al), and the like.

The third insulating layer 16 is formed on the side of the second source-drain metal layer 140 away from the first base 11, and is used for insulating the second source-drain metal layer 140 from the auxiliary functional layer 17 to be formed later. The auxiliary functional layer 17 may have any one of the structures shown in FIGS. 5 and 6. Because each of the first source-drain metal layer 130 and the second source-drain metal layer 140 has a two-layered structure, orthographic projections of the first source-drain metal layer and the second source-drain metal layer on the first base may partially overlap with each other, and thus, a distance between the pixel electrode 15 and the data line Data in each pixel unit 10 may be reduced, thereby facilitating achievement of a high aperture ratio and a high resolution.

Note that when the auxiliary functional layer 17 includes auxiliary sub-portions 170, a width of the third insulating layer 16 in the column direction is slightly larger than a width of the auxiliary portion 170 in the column direction; when the auxiliary functional layer 17 has the hollow-out patterns 171 and the non-hollow-out pattern 172, the third insulating layer 16 is exposed at the edge of each hollow-out pattern 171. This is done to ensure that the third insulating layer 16 is present between the auxiliary functional layer 17 and the underlying electrode, e.g., the pixel electrode, because there is a manufacturing variation in patterning the auxiliary functional layer 17. Certainly, it is desirable that the exposed region of the third insulating layer 16 completely coincides with the exposed region of the auxiliary functional layer 17. The description of structures of layers of the array substrate according to the embodiment of the present disclosure is completed so far. It should be understood that other conventional optical film layers such as an alignment layer may also be included in the array substrate according to the embodiments of the present disclosure, and a description thereof is omitted.

In a second aspect, an embodiment of the present disclosure provides a display panel, where the display panel includes any one of the array substrates in the foregoing embodiments, and certainly, the display panel further includes a color filter substrate disposed opposite to the array substrate, and the liquid crystal layer 30 disposed between the array substrate and the color filter substrate. Since the display panel includes the array substrate in the embodiment of the present disclosure, the display effect is ensured.

In some implementations, the display panel of the embodiment of the present disclosure may be in a normally white mode or a normally black mode. For the normally white mode display panel, the display panel is in a dark state when a power is applied, and the display panel is in a bright state when no power is applied. For the normally black mode display panel, the case is opposite to that of the normally white mode display panel, i.e., the display panel is in the bright state when the power is applied and in the dark state when no power is applied.

Figure 16:
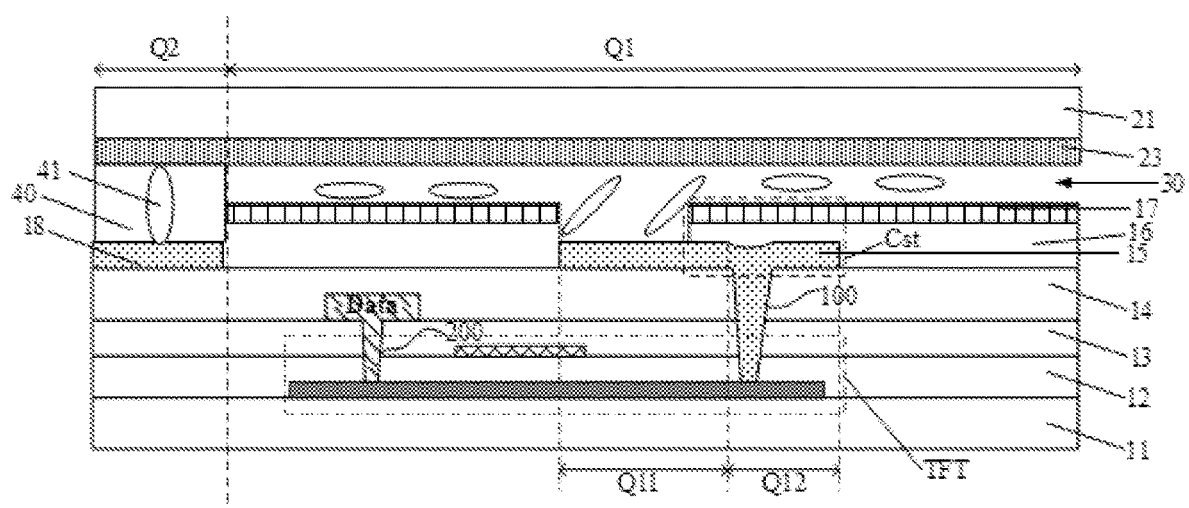
FIG. 16 is a schematic diagram of a display panel according to an embodiment of the present disclosure.

In an example, FIG. 16 is a schematic diagram of a display panel of an embodiment of the present disclosure; as shown in FIG. 16, the display panel includes the array substrate shown in FIG. 4, and no black matrix BM needs to be disposed in the color filter layer 22 of the color filter substrate disposed opposite to the array substrate, and only color filters need to be provided at positions corresponding to the active display areas Q11 of the pixel electrodes 15. The color filters may include a red filter R, a green filter G and a blue filter B. Certainly, the color filters are not limited to the three types described above, and are not limited in the embodiment of the present disclosure. In this case, the common electrode 23 in the color filter substrate forms the liquid crystal capacitor Clc with each pixel electrode 15. As shown in FIG. 16, the display panel is suitable for the normally black mode, and an application scene such as the normally white mode in which the inactive display areas Q12 display a gray scale of L255 (white).

Figure 17:
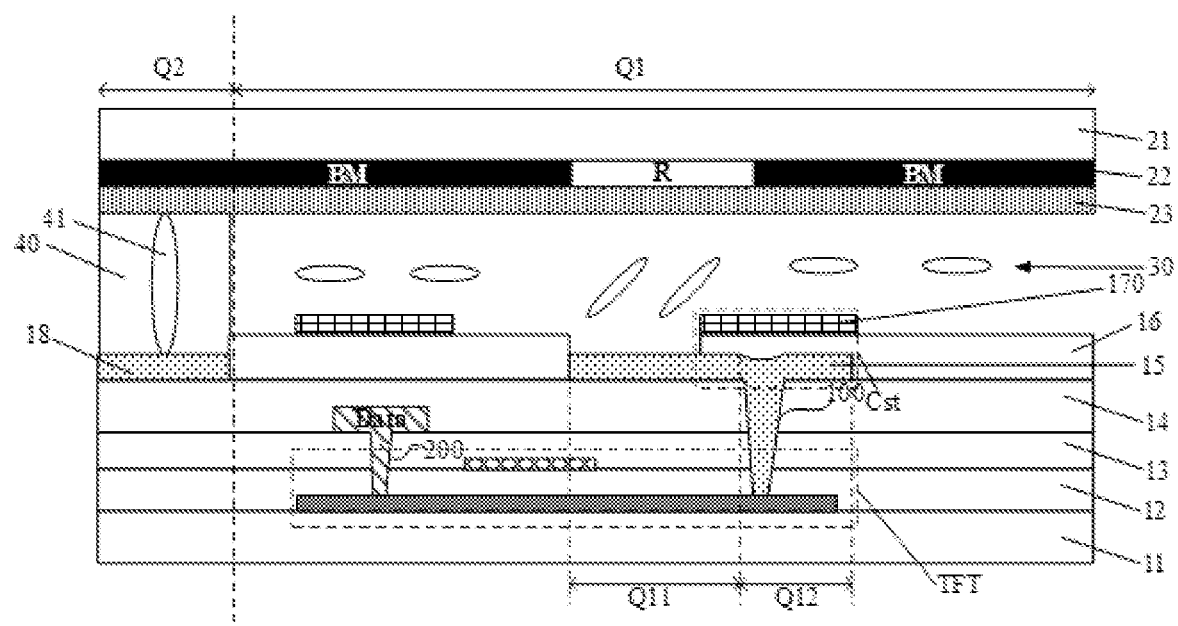
FIG. 17 is a schematic diagram of another display panel according to an embodiment of the present disclosure.

In an example, FIG. 17 is a schematic diagram of another display panel of an embodiment of the present disclosure; as shown in FIG. 17, the display panel includes the array substrate shown in FIG. 7, and is different from the above display panel in that a black matrix BM needs to be disposed in the color filter layer 22 of the color filter substrate in the display panel. The display panel is suitable for the normally white mode display panel, and by providing the black matrix BM for the color film substrate, when an application scene needs to be black in the inactive display areas Q12, the black matrix BM is used for blocking light, and the display effect is ensured. In this case, since the auxiliary functional layer 17 is disposed in the array substrate, the inactive display areas Q12 of the pixel units do not display, so that the requirement for accuracy of the black matrix BM in the color filter substrate in the manufacturing process of the display panel can be reduced while the display effect is ensured.

In a third aspect, an embodiment of the present disclosure provides a display device, which may include any one of the display panels in the above embodiments. Since the display device includes the display panel of the embodiment of the present disclosure, the display effect of the display device can be well guaranteed.

Figure 18:
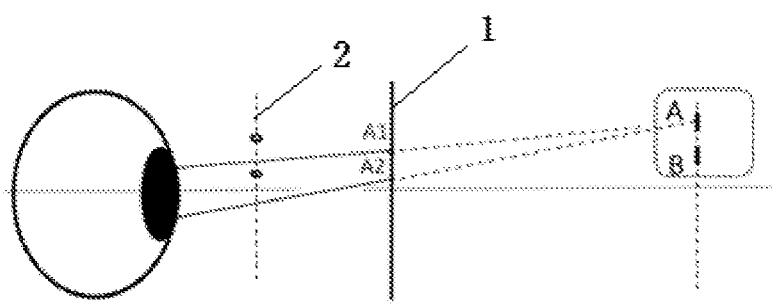
FIG. 18 is a schematic diagram of a display device according to an embodiment of the present disclosure.
Figure 19:
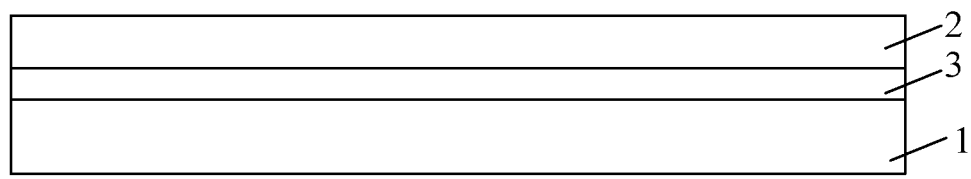
FIG. 19 is a schematic view of another display device according to an embodiment of the present disclosure.

In some implementations, the display device includes not only the display panel 1 described above but also a light source assembly 2; if the display panel 1 is a reflective display panel, that is, the pixel electrode 15 is a reflective electrode, then the light source assembly 2 is a front light source; FIG. 18 is a schematic diagram of another display device according to an embodiment of the present disclosure; as shown in FIG. 18, a polarizing plate 4 is further provided between the front light source and the display panel. FIG. 19 is a schematic diagram of another display device according to an embodiment of the present disclosure; as shown in FIG. 19, if the display panel is a transmissive display panel, that is, the pixel electrode 15 is a transmissive electrode, the light source assembly 2 is a rear light source; in this case, a lower polarizer 401 is disposed on a side of the first base 11 away from the liquid crystal layer 30, and an upper polarizer 402 is disposed on a side of the second base 21 away from the liquid crystal layer 30.

Figure 20:
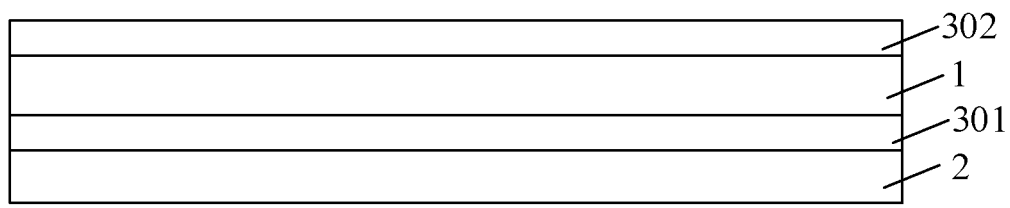
FIG. 20 is a schematic diagram illustrating an application of another display device according to an embodiment of the present disclosure.

In an example, FIG. 20 is a schematic diagram of an application of a display device in an embodiment of the present disclosure; as shown in FIG. 20, the pixel electrode 15 in the display panel 1 of the display device is the reflective electrode, the light source assembly 2 is the front light source, light emitted from the front light source enters the display panel 1, is modulated by the liquid crystal layer and then emitted to a surface of the reflective electrode, and then is reflected by the reflective electrode and emitted along a specific direction, so as to implement light field display. In this case, the front light source includes a number of light-emitting units arranged in an array. By designing relative position relationship between the light-emitting units and the pixel units, the direction of light emitted from each pixel unit is controlled to achieve the light field effect The display device may be a liquid crystal display device or a light-emitting display device, such as any product or component with a display function, for example, a liquid crystal panel, a mobile phone, a tablet computer, a television, a display, a notebook computer, a digital photo frame, a navigator, and the like.

In the display device of the embodiment of the present disclosure, the pixel electrode 15 is the reflective electrode, and in this case, the active display area Q1 of the reflective electrode is a flat area, and the inactive display area Q2 is covered by the auxiliary functional layer 17, so that the direction of the emergent light reflected by the reflective electrode can be effectively controlled, and the accuracy of light field display is ensured; meanwhile, the second source-drain electrode layer 140 where the pixel electrode 15 is located and the first source-drain electrode layer 130 where the data line Data is located are arranged in different layers, so that the size of the storage capacitor Cst is ensured, the distance between the pixel electrode 15 and the data line Data can be reduced, high resolution can be realized under the condition that the size of the display device is limited, and the number of viewpoints in a light field display is ensured; in addition, since no electric field is formed between the auxiliary functional layer 17 on the array substrate and the common electrode 23 on the color film substrate, the liquid crystal therebetween does not deflect, the light emitted to such corresponding position cannot emit out the display device, only the light at the position corresponding to the effective area can emit out the display device, the accuracy of direction of the reflected light can be improved, and the crosstalk is further avoided.

It will be understood that the above embodiments are merely exemplary embodiments adopted to illustrate the principles of the present disclosure, and the present disclosure is not limited thereto. It will be apparent to those skilled in the art that various modifications and improvements can be made without departing from the spirit and scope of the disclosure, and such modifications and improvements are also considered to be within the scope of the disclosure.

The invention claimed is:

1. A display panel, comprising a display substrate, an opposite substrate disposed opposite to the display substrate, and a liquid crystal layer disposed between the display substrate and the opposite substrate, wherein
the display substrate comprises a display area and a peripheral area surrounding the display area;
a first base;
a plurality of pixel units located in the display area and on the first base; each of the plurality of pixel units comprises a thin film transistor and a first electrode, and in each pixel unit, a drain of the thin film transistor is electrically coupled with the first electrode through a first via hole penetrating through an interlayer insulating layer; and an auxiliary functional layer located in the display area and on a side, away from the first base, of a layer where the first electrode is located; wherein, an orthographic projection of the auxiliary functional layer on the first base covers at least a part of an orthographic projection of the first via hole on the first base, and defines an active display area of the first electrode, the opposite substrate comprises:

a second base; and a second electrode located on a side of the second base proximal to the liquid crystal layer, and an orthographic projection of the second electrode on the first base covers an orthographic projection of any first electrode on the first base, and wherein the first electrode comprises a reflective electrode, wherein the display substrate further comprises a second signal connection line disposed in the same layer as the auxiliary functional layer and electrically coupled to the auxiliary functional layer, the second signal connection line is electrically coupled with the second electrode through a sealant; and the second electrode is electrically coupled with the first signal connection line through the sealant.

2. The display panel of claim 1, wherein the opposite substrate further comprises:

a color filter layer located on a side, proximal to the second electrode, of the second base; the color filter layer comprises a plurality of color filters, and the color filters correspond to the pixel units one to one.

3. The display panel of claim 1, wherein the opposite substrate further comprises:

a color filter layer located on a side, proximal to the second electrode, of the second base; the color filter layer comprises a plurality of color filters and a black matrix arranged between adjacent ones of the color filters, and the color filters correspond to the pixel units one to one.

4. The display panel of claim 1, wherein the display substrate further comprises:

a first signal connection line located in the peripheral area, on the first base and electrically coupled with an auxiliary functional layer; the first signal connection line is configured to provide an electrical signal to the auxiliary functional layer.

5. A display panel, comprising a display substrate, an opposite substrate disposed opposite to the display substrate, and a liquid crystal layer disposed between the display substrate and the opposite substrate, wherein the display substrate comprises a display area and a peripheral area surrounding the display area;

a first base;

a plurality of pixel units located in the display area and on the first base; each of the plurality of pixel units comprises a thin film transistor and a first electrode, and in each pixel unit, a drain of the thin film transistor is electrically coupled with the first electrode through a first via hole penetrating through an interlayer insulating layer; and an auxiliary functional layer located in the display area and on a side, away from the first base, of a layer where the first electrode is located; wherein, an orthographic projection of the auxiliary functional layer on the first base covers at least a part of an orthographic projection of the first via hole on the first base, and defines an active display area of the first electrode, the opposite substrate comprises:

a second base; and a second electrode located on a side of the second base proximal to the liquid crystal layer, and an orthographic projection of the second electrode on the first base covers an orthographic projection of any first electrode on the first base, and wherein the first electrode comprises a reflective electrode, wherein the auxiliary functional layer comprises a plurality of hollow-out patterns, and orthographic projections of active display areas of first electrodes are overlapped with orthographic projections of the hollow-out patterns on the first base one to one.

6. The display panel of claim 5, wherein the hollow-out patterns are arranged in one-to-one correspondence with the active display areas of the first electrodes.

7. The display panel of claim 5, wherein the auxiliary functional layer comprises a conductive material.

8. The display panel of claim 7, wherein the conductive material comprises one or a combination of molybdenum, aluminum, and titanium.

9. The display panel of claim 5, wherein the display substrate further comprises:

a first signal connection line located in the peripheral area, on the first base and electrically coupled with an auxiliary functional layer; the first signal connection line is configured to provide an electrical signal to the auxiliary functional layer.

10. The display panel of claim 9, wherein the first signal connection line and the first electrode are disposed in a same layer and are made of a same material.

11. The display panel of claim 9, wherein the first signal connection line surrounds the display area.

12. The display panel of claim 5, the display substrate further comprises:

an active semiconductor layer comprising a channel region, a source doping region and a drain doping region of each thin film transistor;

a gate insulating layer located on a side, away from the first base, of the active semiconductor layer;

a first conductive layer located on a side, away from the active semiconductor layer, of the gate insulating layer and comprises a gate of each thin film transistor;

a first insulating layer located on a side, away from the gate insulating layer, of the first conductive layer;

a first source-drain metal layer located on a side, away from the first conductive layer, of the first insulating layer; the first source-drain metal layer comprises a plurality of data lines, and a source of each thin film transistor is coupled with one of the data lines;

a second gate insulating layer located on a side, away from the first insulating layer, of the first source-drain metal layer; and a second source-drain metal layer located on a side, away from the first source-drain metal layer, of the second gate insulating layer; the second source-drain metal layer comprises the first electrode of each pixel unit.

13. The display panel of claim 12, wherein an orthographic projection of the first source-drain metal layer on the first base and an orthographic projection of the second source-drain metal layer on the first base are at least partially overlapped.

14. A display panel, comprising a display substrate, an opposite substrate disposed opposite to the display substrate, and a liquid crystal layer disposed between the display substrate and the opposite substrate, wherein
the display substrate comprises a display area and a peripheral area surrounding the display area;
a first base;
a plurality of pixel units located in the display area and on the first base; each of the plurality of pixel units comprises a thin film transistor and a first electrode, and in each pixel unit, a drain of the thin film transistor is electrically coupled with the first electrode through a first via hole penetrating through an interlayer insulating layer; and
an auxiliary functional layer located in the display area and on a side, away from the first base, of a layer where the first electrode is located; wherein, an orthographic projection of the auxiliary functional layer on the first base covers at least a part of an orthographic projection of the first via hole on the first base, and defines an active display area of the first electrode,
the opposite substrate comprises:
a second base; and
a second electrode located on a side of the second base proximal to the liquid crystal layer, and an orthographic projection of the second electrode on the first base covers an orthographic projection of any first electrode on the first base, and wherein
the first electrode comprises a reflective electrode, wherein
the display substrate further comprises a plurality of electrode groups arranged at intervals along a first direction, each of the electrode groups comprising a plurality of the first electrodes arranged at intervals along a second direction; the first direction and the second direction intersect;
the first electrode further comprises an inactive display area;
the auxiliary functional layer comprises a plurality of auxiliary portions arranged at intervals along the first direction; orthographic projections of inactive display areas of the first electrodes in each electrode group on the first base are substantially overlapped with an orthographic projection of one of the auxiliary portions corresponding to the electrode group on the first base.

15. The display panel of claim 14, wherein the auxiliary portions are provided in one-to-one correspondence with the electrode groups.

16. The display panel of claim 14, wherein the display substrate further comprises:
a first signal connection line located in the peripheral area, on the first base and electrically coupled with an auxiliary functional layer; the first signal connection line is configured to provide an electrical signal to the auxiliary functional layer.

17. The display panel of claim 16, wherein the first signal connection line and the first electrode are disposed in a same layer and are made of a same material.

18. The display panel of claim 16, wherein the first signal connection line surrounds the display area.

19. The display panel of claim 14, the display substrate further comprises:
an active semiconductor layer comprising a channel region, a source doping region and a drain doping region of each thin film transistor;
a gate insulating layer located on a side, away from the first base, of the active semiconductor layer;
a first conductive layer located on a side, away from the active semiconductor layer, of the gate insulating layer and comprises a gate of each thin film transistor;
a first insulating layer located on a side, away from the gate insulating layer, of the first conductive layer;
a first source-drain metal layer located on a side, away from the first conductive layer, of the first insulating layer; the first source-drain metal layer comprises a plurality of data lines, and a source of each thin film transistor is coupled with one of the data lines;
a second gate insulating layer located on a side, away from the first insulating layer, of the first source-drain metal layer; and
a second source-drain metal layer located on a side, away from the first source-drain metal layer, of the second gate insulating layer; the second source-drain metal layer comprises the first electrode of each pixel unit.

20. The display panel of claim 19, wherein an orthographic projection of the first source-drain metal layer on the first base and an orthographic projection of the second source-drain metal layer on the first base are at least partially overlapped.

* * * * *